(No Model.)
P. DAVIES.
BALL BEARING.
No. 526,439. Patented Sept. 25, 1894.
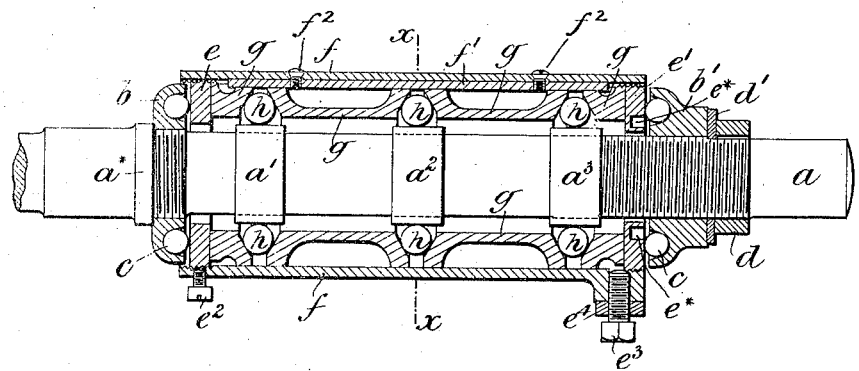
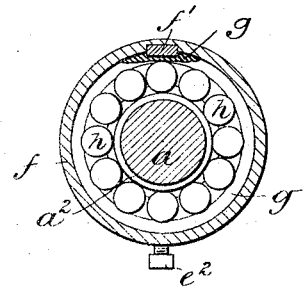
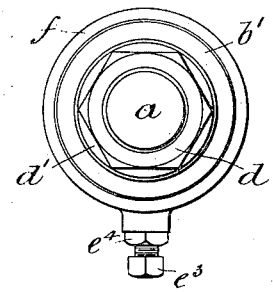

UNITED STATES PATENT OFFICE.

PRESTON DAVIES, OF LONDON, ENGLAND.

BALL-BEARING.

SPECIFICATION forming part of Letters Patent No. 526,439, dated September 25, 1894.

Application filed January 17, 1894. Serial No. 497,154. (No model.) Patented in England September 29, 1892, No. 17,407, and in Germany November 22, 1892, No. 69,613.

*To all whom it may concern:*

Be it known that I, PRESTON DAVIES, residing at No. 12 Kempson Road, Walham Green, Fulham, London, in the county of Middlesex, England, have invented certain new and useful Improvements in Ball-Bearings, (for which I have received Letters Patent in Great Britain, No. 17,407, dated September 29, 1892, and in Germany, No. 69,613, dated November 22, 1892,) of which the following is a specification.

My invention relates to ball bearings adapted especially for use in velocipede and other wheels, in which bearings are provided at any desired number of intermediate points, all capable of adjustment approximately to the same degree by one mechanical action, the load on the bearing being equally distributed over the axle.

The accompanying drawings illustrate my invention applied to a bearing suitable for a bicycle.

Figure 1 is a longitudinal section of the bearing; Fig. 2, a cross section thereof on the line $x$—$x$ of Fig. 1, and Fig. 3 is an end elevation.

The axle $a$ upon which the bearing revolves I prefer to make of mild steel, and the ball paths $a'$ $a^2$ $a^3$ of hardened steel, securely attached to the axle, but capable of adjustment laterally in any convenient manner. At the ends of the axle I provide collars $b$ $b'$, having annular grooves for the balls $c$. The collar $b$, is made fast to the axle, against the collar $a^*$ on the axle, but the collar $b'$ is capable of adjustment for lateral wear on the bearing balls by means of the screw on the axle, as shown, and is secured or locked in position by the nut $d$. A washer $d'$ is placed between the collar $b'$, and the nut $d$, and is prevented from revolving by its engagement with a flattened portion of the axle.

Contiguous to the collars $b$ $b'$ are flat plates $e$ $e'$, one screwed into each end of the hollow tube or hub $f$. The plate $e$ is normally held in a fixed position by the set screw $e^2$, and need only be moved when it is desired to alter the position of the bearing in its case, but the plate $e'$ is capable of adjustment for wear of the bearing by means of a key having projections which engage with openings $e^*$ in the face of the plate. This plate is secured in any desired position by a set screw $e^3$ which can, in turn, be secured by the lock nut $e^4$.

The hub or casing $f$, which forms the outer part of the bearing, is shown in the drawings as plane on its exterior, but it will be understood that such casing can be of any desired shape or form for the purpose for which it is intended to be used.

I place in the casing single end cones, and any desired number of double cones $g$, each formed with beveled edges, as shown, so that in tightening the bearing in the manner hereinafter described, any looseness produced by radial wear is overcome. These cones which form bearings for the balls $h$ are capable of lateral adjustment for position and wear by the plates $e$ and $e'$. They are caused to revolve (in the case of the bearing being used for a wheel) with the outer casing $f$, by means of a feather or key $f'$, which is secured to the casing $f$ by screws $f^2$. Upon turning the plate $e'$, the cones $g$ will be brought to bear equally upon all the balls $h$, the beveled edges of such cones serving to force the balls onto their axial paths, overcoming all radial wear, and distributing the load equally along the bearing. Any usual or suitable means may be provided for the lubrication of the bearing. The number of cones and bearing surfaces may be varied in accordance with the sizes of the total bearing, and the load intended to be put upon it.

As will be observed, the adjacent ends of the cones are not in contact with each other, and may therefore be adjusted toward each other to take up wear, resulting from the contact of the balls $h$ with the inclined surfaces of the cones. The arrangement of the cones and the end plates within the sleeve is a compact one and the adjusting devices are simple and easily operated.

I claim as my invention—

The combination of a sleeve or casing, an axle extending therethrough, a series of cones having adjacent inclined ends out of contact with each other, balls arranged between the adjacent, inclined ends of the cones, end pieces or disks adjustably connected with the sleeve or casing, a collar $b$ secured to the axle and having recesses containing balls bearing on one of the end pieces, a collar $b'$ having recesses containing balls bearing on the opposite end piece, and a nut bearing against said collar to hold it in position on the axle.

In testimony whereof I have hereunto subscribed my name.

PRESTON DAVIES.

Witnesses:
 A. F. SPOONER,
 WM. THOS. MARSHALL.